United States Patent
Uegaki et al.

(10) Patent No.: US 8,603,678 B2
(45) Date of Patent: Dec. 10, 2013

(54) ACTIVE MATERIAL CONTAINING NIOBIUM COMPOUND FOR USE IN NONAQUEOUS ELECTROLYTE BATTERY AND NONAQUEOUS ELECTROLYTE BATTERY WITH POSITIVE ELECTRODE CONTAINING THE ACTIVE MATERIAL

(75) Inventors: Shunsuke Uegaki, Osaka (JP); Masao Kondou, Osaka (JP); Yasuo Akai, Osaka (JP); Tomoyuki Shose, Osaka (JP); Satoru Naruse, Osaka (JP)

(73) Assignees: SANYO Electric Co., Ltd., Moriguchi-shi, Osaka (JP); SANYO Energy Tottori Co., Ltd., Moriguchi-shi, Osaka (JP)

(*) Notice: Subject to any disclaimer, the term of this patent is extended or adjusted under 35 U.S.C. 154(b) by 1374 days.

(21) Appl. No.: 12/042,054

(22) Filed: Mar. 4, 2008

(65) Prior Publication Data

US 2008/0220332 A1 Sep. 11, 2008

(30) Foreign Application Priority Data

Mar. 5, 2007 (JP) ................................ 2007-54663

(51) Int. Cl.
*H01M 4/13* (2010.01)

(52) U.S. Cl.
USPC ............... 429/231.5; 429/231.95; 429/231.8; 429/218.1; 252/182.1; 423/594.8

(58) Field of Classification Search
USPC ................... 429/231.5, 231.95, 231.8, 218.1; 252/182.1; 423/594.8
See application file for complete search history.

(56) References Cited

FOREIGN PATENT DOCUMENTS

| JP | 2000-138075 | * | 5/2000 |
| JP | 2002-203545 A | | 7/2002 |
| RU | 2188159 | * | 8/2002 |

OTHER PUBLICATIONS

"Sanyo Lithium Batteries Catalogue" Printed in Japan, Oct. 10, 2003.

* cited by examiner

*Primary Examiner* — Laura Weiner
(74) *Attorney, Agent, or Firm* — Westerman, Hattori, Daniels & Adrian, LLP

(57) ABSTRACT

A positive electrode active material for a nonaqueous electrolyte battery. The positive electrode active material has been manufactured through a mixing step and a heating step. In the mixing step, a mixture is produced by mixing niobium pentoxide ($Nb_2O_5$) with lithium hydroxide (LiOH) at a molar ratio of 1:1. In the heating step, the mixture is heated in an atmosphere of air at substantially 800° C. The positive electrode active material having been produced through the mixing process and the heating process causes the plateau potential in a discharge to be approximately 1.0 [V] for lithium. And the nonaqueous electrolyte battery using the positive electrode active material can operate at a voltage of approximately 1.0 [V].

4 Claims, 4 Drawing Sheets

ACTIVE MATERIAL CONTAINING NIOBIUM COMPOUND FOR USE IN NONAQUEOUS ELECTROLYTE BATTERY AND NONAQUEOUS ELECTROLYTE BATTERY WITH POSITIVE ELECTRODE CONTAINING THE ACTIVE MATERIAL

BACKGROUND OF THE INVENTION (1) Field of the Invention

The present invention relates to an active material for nonaqueous electrolyte battery that is used as a backup power source, and to a nonaqueous electrolyte battery containing the active material.

(2) Description of the Related Art

Conventionally, nonaqueous electrolytic solution secondary batteries such as lithium manganese dioxide batteries have been used widely as a backup power source for a mobile phone or the like. One of the characteristics of the nonaqueous electrolytic solution secondary batteries is that they have high voltage and high energy density. For example, lithium manganese dioxide batteries have charge/discharge voltage of 3 [V] or more.

Meanwhile, in recent years, mobile equipment has come to operate at low voltages in response to the demand for low power consumption. Therefore, nonaqueous electrolytic solution secondary batteries to be used as backup power sources are now required to have charge/discharge voltage of 2 [V] or less. Developed for the demand and in practical use are niobium lithium batteries in which niobium pentoxide is used as a positive electrode active material and lithium alloy is used for negative electrodes.

Niobium lithium batteries have a flat discharge voltage in a range approximately from 1.5 [V] to 1.2 [V] and enable a charging at approximately 2 [V]. Structures of such niobium lithium batteries are disclosed by, for example, Japanese Patent Application Publication No. 2002-203545 and a non-patent document, "Sanyo Lithium Battery (2004-10)", Sanyo Electric Co., Ltd., 2004, p. 13.

However, efforts are being made to lower the voltages of mobile equipment even further. Therefore, there is a demand for nonaqueous electrolytic solution batteries that can operate at a lower voltage. For example, a nonaqueous electrolyte battery that can operate at a voltage of approximately 1.0 [V] is desired to be developed.

SUMMARY OF THE INVENTION

An object of the present invention is therefore to provide an active material for achieving a nonaqueous electrolyte battery that operates at a voltage of approximately 1.0 [V], or a nonaqueous electrolyte battery containing the active material.

According to one aspect of the present invention, for achieving the above object, there is provided an active material for a nonaqueous electrolyte battery. The active material has been manufactured through a mixing step and a heating step. In the mixing step, a mixture is produced by mixing niobium pentoxide ($Nb_2O_5$) with lithium hydroxide (LiOH) at a molar ratio of 1:1. Here, an element ratio of niobium (Nb) to lithium (Li) in the mixture is 2:1.

In the heating step, the mixture is heated in an atmosphere of air at substantially 800° C.

The active material of the present invention for a nonaqueous electrolyte battery having been produced through the mixing process and the heating process causes the plateau potential in a discharge to be approximately 1.0 [V] for metal lithium. The reason is unknown, but it is thought that this is because, when the mixture of niobium pentoxide and lithium hydroxide is heated at a high temperature (substantially 800° C.), the materials react to each other, and the mixture turns into a niobium compound (lithium-niobium complex compound) having a different structure from the original niobium pentoxide and lithium hydroxide.

It should be noted here that the "plateau potential in a discharge" means a portion in which the potential is approximately constant and flat horizontally, in a graph of the discharge curve obtained as a result of discharging the active material from the charged state, where the discharge potential is plotted vertically and the discharge time or capacity is plotted to the right.

The active material of the present invention may be modified as follows.

In the above-described active material, the niobium pentoxide mixed in the mixing step may be niobium pentoxide having a monoclinic crystal structure.

According to another aspect of the present invention, for achieving the above object, there is provided a nonaqueous electrolyte battery comprising: a positive electrode including an active material that contains a niobium compound; and a negative electrode including a material that has a discharge potential of as low as substantially 1.0 V for the positive electrode active material, wherein the above-described active material of the present invention is used as the active material of the positive electrode.

The nonaqueous electrolyte battery of the present invention with the above-described structure can operate at a voltage of substantially 1.0 [V], which meets the demand for further lowering the voltages of mobile equipment.

It should be noted here that in the above-described nonaqueous electrolyte battery, the negative electrode may include a material selected from a group consisting of: (i) a metal lithium; (ii) a lithium alloy; and (iii) a material selected from a group of materials that can store and release lithium ions, consisting of an alloy, a carbon material, and a silicon compound.

BRIEF DESCRIPTION OF THE DRAWINGS

These and the other objects, advantages and features of the invention will be come apparent from the following description thereof taken in conjunction with the accompanying drawings which illustrate a specific embodiment of the invention.

In the drawings.

DESCRIPTION OF THE PREFERRED EMBODIMENT

The following describes one example of a preferred embodiment of the present invention, with reference to the attached drawings. It should be noted here that the embodiment described in the following is one example provided to facilitate the understanding of the structure and effects of the present invention, but that the present invention is not limited to the following embodiment except for its essential features.

1. Structure of Nonaqueous Electrolyte Battery 10

Figure 1:
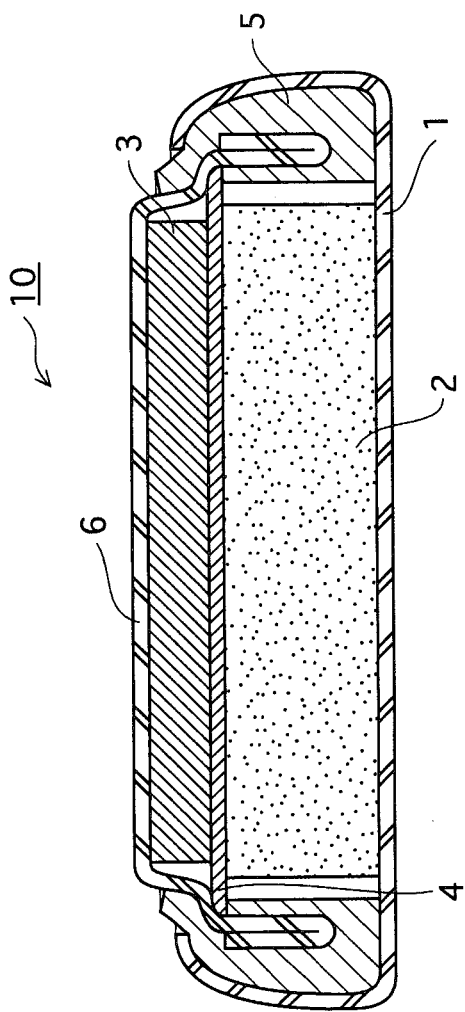
FIG. 1 is a cross-sectional view showing the structure of the nonaqueous electrolyte battery 10 in the embodiment.

The structure of a nonaqueous electrolyte battery 10 in the present embodiment will be described with reference to FIG. 1. FIG. 1 is a cross-sectional view showing the structure of the nonaqueous electrolyte battery 10 in the present embodiment.

As shown in FIG. 1, the nonaqueous electrolyte battery 10 is in the shape of a coin in the outer appearance, and in which a positive electrode 2 and a negative electrode 3 with a separator 4 provided therebetween to separate them constitute an electrode assembly, and the electrode assembly is housed in an internal space created by a positive electrode can 1 and a negative electrode cap 6. The positive electrode 2 is made of a compound such as a niobium compound, and the negative electrode 3 includes a lithium-aluminum alloy as an active material.

The separator 4 is soaked with a nonaqueous electrolytic solution. In the nonaqueous electrolyte battery 10, an opening of the positive electrode can 1 is fixed by caulking with the negative electrode cap 6, with a ring-shaped insulating gasket 5 made of polyphenylene sulfide (PPS) inserted therebetween, so that the internal space is sealed.

As shown in FIG. 1, a main surface of the positive electrode 2 is in contact with an inner bottom wall of the positive electrode can 1 so that the positive electrode 2 is electrically connected with the positive electrode can 1. On the other hand, the negative electrode 3 is electrically connected with the negative electrode cap 6. The nonaqueous electrolyte battery 10 with this structure enables an electrochemical energy generated in the electrode assembly, which is composed of the positive electrode 2, the negative electrode 3 and the separator 4, to be extracted to outside as an electric energy, where the positive electrode can 1 and the negative electrode cap 6 function as the terminals of the two electrodes.

2. Production of Nonaqueous Electrolyte Battery 10

(1) Production of Positive Electrode Active Material 24

First, a production method of a positive electrode active material 24 will be described with reference to FIG. 2.

Figure 2:
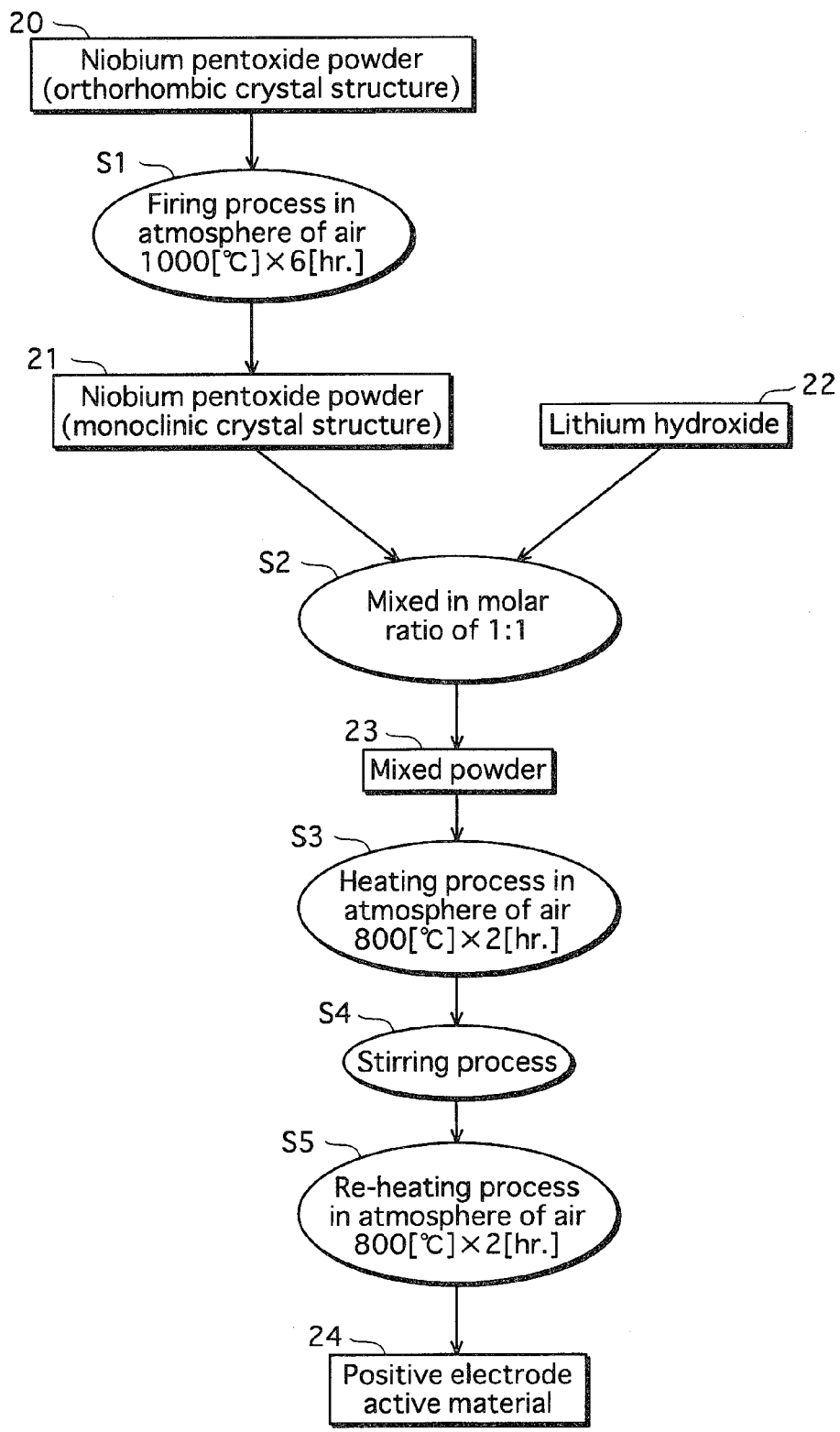
FIG. 2 is a process chart showing a production method of the positive electrode active material 24.

As shown in FIG. 2, niobium pentoxide powder 20 of orthorhombic crystal structure is prepared. As the niobium pentoxide powder 20 to be prepared in the production of the positive electrode active material 24, niobium pentoxide powder made by Mitsui Mining & Smelting Co., Ltd. may be used, for example. The prepared niobium pentoxide powder 20 is subjected to a firing process (S1) in which the niobium pentoxide powder 20 is heated in the atmosphere of air at 1000[° C.] for 6 [hr.]. Through the firing process S1, the niobium pentoxide powder 20 of orthorhombic crystal structure is converted into a niobium pentoxide powder 21 of monoclinic crystal structure. It should be noted here that niobium pentoxide turns to have the monoclinic crystal structure at 900[° C.] or higher, and that accordingly, the heating process may be performed at an even higher temperature.

Next, in a mixing process S2, the niobium pentoxide powder 21 obtained with the firing process S1 is mixed with lithium hydroxide 22. As the lithium hydroxide 22 to be used in the mixing process S2, lithium hydroxide of the first grade made by Kishida Chemical Co., Ltd. may be used. The mixture ratio of the niobium pentoxide powder 21 and the lithium hydroxide 22 mixed in the mixing process S2 is 1:1 in molar ratio. A mixed powder 23 of the mixture ratio is obtained with the process.

Next, the mixed powder 23 is subjected to a heating process (S3) in which the mixed powder 23 is heated in an electric furnace in the atmosphere of air at substantially 800[° C.] for 2 [hr.] After the heating process S3, the mixed powder 23 is brought out from the electric furnace and is subjected to a stirring process (S4) in which the mixed powder 23 is stirred. The stirring is performed so as to accelerate the reaction between the niobium pentoxide powder 21 and the lithium hydroxide 22.

Next, the mixed powder 23 is brought back into the electric furnace and is subjected to a re-heating process (S5) in which the mixed powder 23 is again heated in the atmosphere of air at substantially 800[° C.] for 2 [hr.].

The positive electrode active material 24 is obtained finally after the above-described processes S1 to S5 are performed.

(2) Production of Positive Electrode 2

The positive electrode active material 24 obtained with the above-described processes, black lead as a conductive agent, Ketjen Black as a conductive agent, synthetic zeolite as a storage degradation inhibitor, and fluorinated ethylene propylene resin (FEP) as a bonding agent are mixed at a ratio of 75.5:4.0:2.5:15:3.0 in mass ratio. This mixture is then formed into a circular disk by adding pressure. The positive electrode 2 obtained as a result of this is 1.96 [mm] in diameter, 0.78 [mm] in thickness, and 5.8 [mg] in mass.

(3) Production of Negative Electrode 3

First, a circular disk is punched out from a metal lithium plate of a predetermined thickness that was made by extending the material by application of pressure.

Then prepared is the negative electrode cap 6 made of a stainless aluminum clad material.

The metal lithium circular disk is crimped with the negative electrode cap 6. The metal lithium circular disk is crimped such that it is in contact with an aluminum side surface of the negative electrode cap 6. When a charge/discharge is performed after the battery is sealed off, an alloy-making reaction occurs between the aluminum material of the negative electrode cap 6 and the metal lithium circular disk. The reaction produces the negative electrode 3 in the final state that includes a lithium-aluminum alloy as an active material.

(4) Preparing Nonaqueous Electrolytic Solution

The nonaqueous electrolytic solution is prepared by mixing (i) a solvent which is made by mixing propylene carbonate (PC), diethylene glycol dimethyl ether (DDE), and tetraglyme (Tetraethylene Glycol Dimethyl Ether) at a ratio of 1:89:10 in weight ratio, with (ii) 0.80 [wt %] of n-butyl formate and Lithium Bis(trifluoromethanesulfonyl)imide (LiTFSI), at a ratio of 0.75M. It should be noted here that the nonaqueous electrolytic solution is not illustrated in FIG. 1 or in any other drawings.

(5) Manufacturing Nonaqueous Electrolyte Battery 10

The positive electrode 2, the negative electrode 3 and the nonaqueous electrolytic solution having been produced as described above are used to manufacture the nonaqueous electrolyte battery 10 that is structured as shown in FIG. 1. The separator for the nonaqueous electrolyte battery 10 is prepared by soaking a piece of nonwoven cloth made of polyphenylene sulfide with the nonaqueous electrolytic solution produced as described above.

With regard to the dimension of the nonaqueous electrolyte battery 10 in the present embodiment, the nonaqueous electrolyte battery 10 is, for example, 1.41 [mm] in thickness and 4.73 [mm] in diameter.

3. Advantages of Nonaqueous Electrolyte Battery 10

The nonaqueous electrolyte battery 10 can operate at a voltage of substantially 1.0 [V], which meets the demand for further lowering the voltages of mobile equipment. It is thought that the nonaqueous electrolyte battery 10 can operate at a voltage of approximately 1.0 [V] because the positive electrode active material 24 is produced through a process shown in FIG. 2. A detailed principle of this is unknown, but the inventors determined that at least the positive electrode active material 24 having been produced through the mixing process S2 and the heating process S3 causes the plateau potential in a discharge to be approximately 1.0 [V] for lithium. The nonaqueous electrolyte battery 10 is manufactured based on the fact determined by the inventors.

It should be noted here that the heating time in the heating process S3, whether or not to perform the stirring process S4 and/or the re-heating process S5, and the processing condition of each process can be changed appropriately by taking into consideration, for example, the characteristics, mass, or shape of the materials to be used.

4. Confirmation Experiment

INVENTION EXAMPLE

An example of the nonaqueous electrolyte battery 10 containing the positive electrode active material 24 of the present embodiment was manufactured as an invention example. In the following description, the nonaqueous electrolytic solution and the nonaqueous electrolyte battery of the invention example are referred to as "invention active material" and "invention battery", respectively.

COMPARATIVE EXAMPLE

For comparison with the invention example, a nonaqueous electrolyte battery including a positive electrode active material that is composed of only niobium pentoxide ($Nb_2O_5$) was manufactured as a comparative example. A niobium pentoxide of monoclinic crystal structure (corresponding to the niobium pentoxide powder 21 shown in FIG. 2) that had been obtained by subjecting a niobium pentoxide of orthorhombic crystal structure to a firing process was used as the positive electrode active material of the comparative example. In the following description, the nonaqueous electrolytic solution and the nonaqueous electrolyte battery of the comparative example are referred to as "comparative active material" and "comparative battery", respectively.

EXPERIMENT 1

The invention active material was subjected to a single electrode experiment which is a discharge experiment using a single electrode.

In the single electrode experiment, first an electrode was produced by mixing the invention active material, a conductive agent (acetylene black), and a bonding agent (polyvinylidene-fluoride) at a ratio of 8:1:1, and then a discharge was conducted by applying a current of 0.5 [mA] to the produced electrode that was laid in an electrolytic solution that had been prepared by adding lithium hexafluorophosphate as an electrolyte to a mixed solvent of ethylene carbonate and diethoxy carbonate. The results are shown in FIG. 3.

Figure 3:
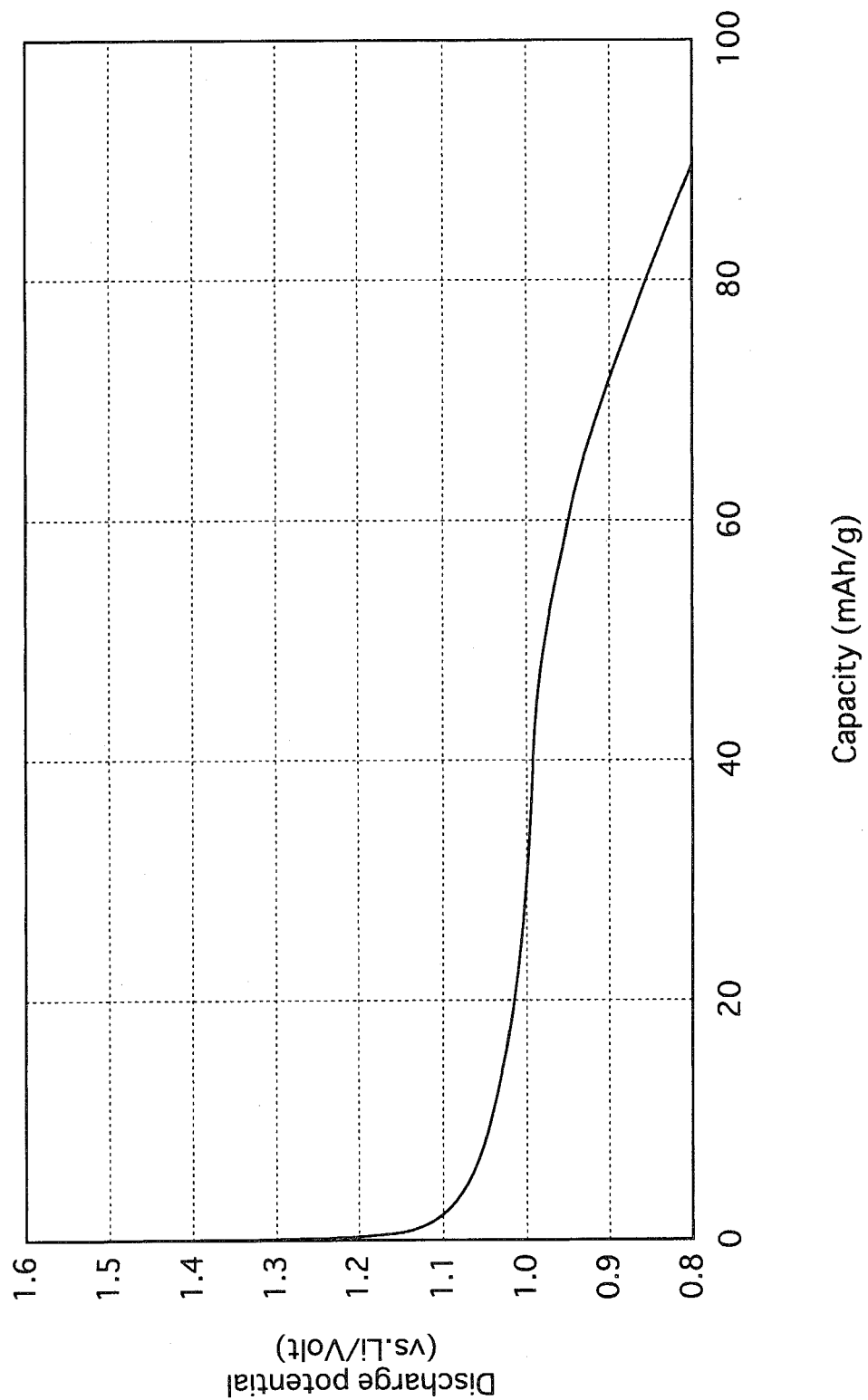
FIG. 3 is a plot of discharge potential vs. capacity in the nonaqueous electrolyte battery 10 in the embodiment.

As shown in FIG. 3, it is understood that the electrode containing the invention active material provides a flat potential at approximately 1.0 [V] for lithium in a discharge (the plateau potential in a discharge is approximately 1.0 [V]).

EXPERIMENT 2

Next, the invention battery and the comparative battery were subjected to a constant-resistance discharge experiment (cutoff voltage: 1.0 [V]). The invention battery and the comparative battery were heated at 260[° C.] in a reflow furnace on the assumption that a reflow soldering was performed onto the circuit board of the battery. The invention battery and the comparative battery after the heating process were subjected to a constant-resistance discharge experiment (cutoff voltage: 1.0 [V]), with resistances of 300 [kΩ] being connected to each other. The results are shown in FIG. 4.

Figure 4:
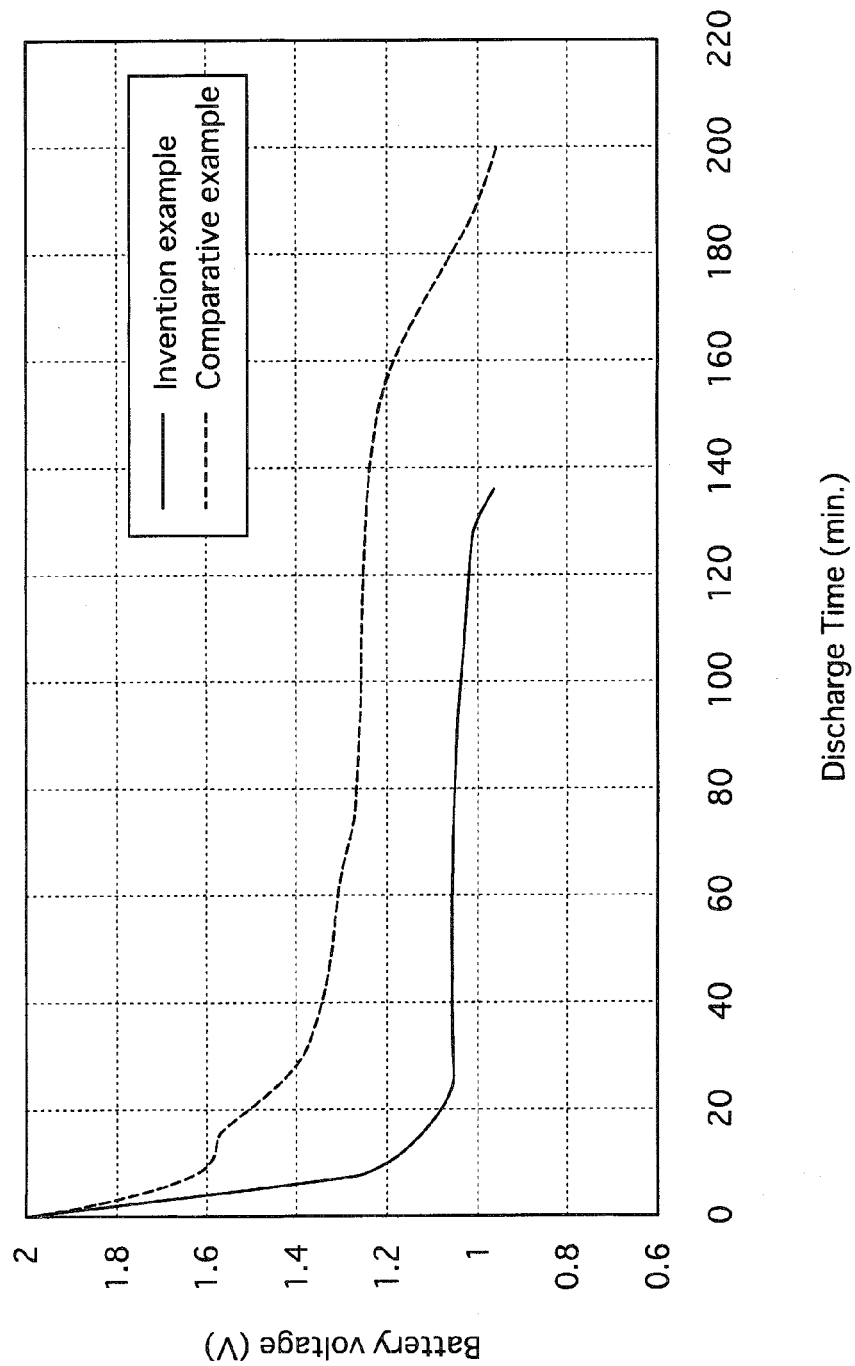
FIG. 4 is a plot of battery voltage vs. discharge time in the invention example and the comparative example.

As shown in FIG. 4, it is understood that the comparative battery provides a flat potential at a range from 1.2 [V] to 1.3 [V] in a discharge.

In contrast, the invention battery provides a flat potential at approximately 1.0 [V] (at a range from 1.0 [V] to 1.1[V]).

<Consideration>

The above-described results of experiments indicate that the invention active material has a plateau potential lower than the comparative active material (niobium pentoxide). Also, it is understood that the invention battery provides a flat potential at approximately 1.0 [V] in a discharge since the invention active material contained in the battery has a plateau potential lower than the comparative active material.

5. Others
<Supplementary Notes>

Up to now, a preferred embodiment of the present invention has been described as one example to facilitate the understanding of the structure and effects of the present invention. However, the present invention is not limited to the above-described embodiment or the like except for its essential features, and the present invention can be modified as necessary as far as the essential features are not changed.

For example, in the above-described embodiment, a metal lithium is used in the negative electrode. However, not limited to this, the negative electrode may contain any material that can store and release lithium ions, such as a lithium alloy, an alloy, a carbon material, or a silicon compound.

As the constituent material of the insulating gasket 5, polyether ether ketone (PEEK) or polyether ketone (PEK) may be used, as well as polyphenylene sulfide (PPS) described above.

As the solvent for the electrolytic solution, the following solvents may be used as well as the solvent adopted in the nonaqueous electrolyte battery 10 in the above-described embodiment: a high-boiling solvent such as ethylene carbonate, vinylene carbonate, γ-butyrolactone, sulfolane, or 3-methyl sulfolane; a mixed solvent of any of the above-mentioned high-boiling solvents and any of low-boiling solvents such as diethyl carbonate, dimethyl carbonate, methyl ethyl carbonate, tetrahydrofuran, 1,2-dimethoxyethane, and ethoxymethoxyethane; or a mixed solvent of two or more high-boiling solvents.

Also, as the solvent for the electrolytic solution, $LiPF_6$, $LiAsF_6$, $LiClO_4$, $LiBF_4$, $LiCF_3$, $SO_3$, $LiN(C_2F_5SO_2)_2$ or the like may be used as well as LITFSI described above.

In the above-described embodiment, the nonaqueous electrolyte battery 10 is coin-shaped, as one example. However, not limited to this, the present invention is also applicable to a nonaqueous electrolyte battery in a cylindrical shape, or a nonaqueous electrolyte battery in a rectangular shape, or the like.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:
1. An active material for a nonaqueous electrolyte battery, the active material having been manufactured through:
   a mixing step for producing a mixture by mixing niobium pentoxide with lithium hydroxide at a molar ratio of 1:1; and a heating step for heating the mixture in an atmosphere of air at substantially 800° C., wherein the niobium pentoxide mixed in the mixing step has a monoclinic crystal structure converted from an orthorhombic crystal structure through a firing process.

2. A nonaqueous electrolyte battery comprising:

a positive electrode including an active material that contains a niobium compound; and a negative electrode including a material that has a discharge potential of substantially 1.0 V to 1.1 V for the positive electrode active material, wherein the positive electrode active material has been manufactured through:

a mixing step for producing a mixture by mixing niobium pentoxide with lithium hydroxide at a molar ratio of 1:1; and a heating step for heating the mixture in an atmosphere of air at substantially 800° C., wherein the niobium pentoxide mixed in the mixing step has a monoclinic crystal structure converted from an orthorhombic crystal structure through a firing process.

3. The nonaqueous electrolyte battery of claim 2, wherein the positive electrode active material has been manufactured further through:

a stirring step for stirring the mixture having been through the heating step; and a re-heating step for re-heating the mixture having been through the stirring step, in an atmosphere of air at substantially 800° C.

4. The nonaqueous electrolyte battery of claim 2, wherein the negative electrode includes a material selected from a group consisting of: (i) a metal lithium; (ii) a lithium alloy; and (iii) a material selected from a group of materials that can store and release lithium ions, consisting of an alloy, a carbon material, and a silicon compound.

* * * * *